United States Patent
Jung et al.

(10) Patent No.: US 8,580,203 B2
(45) Date of Patent: Nov. 12, 2013

(54) FLUIDIZED BED REACTOR

(75) Inventors: Yunsub Jung, Seoul (KR); Keunho Kim, Ulsan (KR); Yeokyun Yoon, Daejeon (KR); Ted Kim, Daejeon (KR); Yong Ki Park, Daejeon (KR); Kyung Koo Yoon, Daejeon (KR); Myung Hoi Koo, Daejeon (KR)

(73) Assignee: SiliconValue LLC, Daejeon (KR)

( * ) Notice: Subject to any disclaimer, the term of this patent is extended or adjusted under 35 U.S.C. 154(b) by 9 days.

(21) Appl. No.: 13/247,420

(22) Filed: Sep. 28, 2011

(65) Prior Publication Data

US 2012/0082592 A1 Apr. 5, 2012

(30) Foreign Application Priority Data

Oct. 1, 2010 (KR) .................... 10-2010-0095938

(51) Int. Cl.
*B01J 8/18* (2006.01)
*F27B 15/00* (2006.01)
*F27B 15/14* (2006.01)
*F27B 15/16* (2006.01)
*B01J 19/00* (2006.01)
*B01J 10/00* (2006.01)
*B01J 8/00* (2006.01)
*C01B 33/00* (2006.01)
*C01B 33/02* (2006.01)
*C23C 8/00* (2006.01)
*C23C 14/26* (2006.01)

(52) U.S. Cl.
USPC ........... 422/139; 422/129; 422/146; 422/187; 422/198; 423/324; 423/348; 423/349; 427/457; 427/585; 427/587; 427/588

(58) Field of Classification Search
USPC .......... 422/129, 139, 146, 187, 198; 423/324, 423/348, 349; 427/457, 585, 587, 588
See application file for complete search history.

(56) References Cited

U.S. PATENT DOCUMENTS 3,174,834 A   3/1965 Edwards et al.
3,660,136 A * 5/1972 Guilbault et al. ............. 427/461
(Continued)

FOREIGN PATENT DOCUMENTS

DE      19948395 A1   5/2001
EP       1990314 A2   11/2008
(Continued)

OTHER PUBLICATIONS

Machine translation of KR 10-0756310 A, which was provided in IDS dated Apr. 5, 2013 and published Sep. 7, 2007.*
Machine translation of KR 10-0783667 A, which was provided in IDS dated Apr. 5, 2013 and published on Dec. 7, 2007.*
Wen-Chng Yang, "Fuidization, solids handling, and processing," book, 1939, Noyes Publications, Westwood, New Jersey, USA.

*Primary Examiner* — Walter D Griffin
*Assistant Examiner* — Natasha Young
(74) *Attorney, Agent, or Firm* — Patent Office of Dr. Chung S. Park (57) ABSTRACT

A fluidized bed reactor is disclosed. The fluidized bed reactor includes a head; a first body part connected with the head, located under the head, the first body part having a first reaction pipe provided therein; a second body part connected with the first body part, located under the first body part, the second body part having a second reaction pipe provided therein; and a bottom part connected with the second body part, located under the second body part, the bottom part having a flowing-gas supply nozzle, a reaction gas supply nozzle, a heater and an electrode assembled thereto.

18 Claims, 9 Drawing Sheets

(56) References Cited

U.S. PATENT DOCUMENTS

| | | | |
|---|---|---|---|
| 4,166,376 A * | 9/1979 | Callahan et al. ............ | 374/1 |
| 4,427,053 A * | 1/1984 | Klaren ................ | 165/104.16 |
| 4,460,037 A * | 7/1984 | De Feo et al. ............ | 165/76 |
| 4,642,227 A | 2/1987 | Flagan et al. | |
| 5,065,131 A * | 11/1991 | Ducourroy et al. ......... | 338/237 |
| 5,435,972 A * | 7/1995 | Daw et al. ............... | 422/108 |
| 6,007,869 A | 12/1999 | Schreieder et al. | |
| 2002/0102850 A1 | 8/2002 | Kim et al. | |
| 2008/0241046 A1* | 10/2008 | Hertlein et al. ............ | 423/349 |
| 2008/0299291 A1 | 12/2008 | Weidhaus et al. | |
| 2009/0047204 A1* | 2/2009 | Kim et al. ............... | 423/349 |
| 2010/0044342 A1 | 2/2010 | Kim et al. | |
| 2011/0117729 A1 | 5/2011 | Osborne et al. | |

FOREIGN PATENT DOCUMENTS

| | | | |
|---|---|---|---|
| JP | 11139817 A2 | 5/1999 | |
| JP | 2002-220219 A | 8/2002 | |
| JP | 2008-273831 A2 | 11/2008 | |
| JP | 2009-502704 A | 1/2009 | |
| JP | 2009-507749 A | 2/2009 | |
| JP | 2009-525937 A | 7/2009 | |
| JP | 2009-536915 A | 10/2009 | |
| JP | 2010-500274 A | 1/2010 | |
| KR | 10-2002-0059172 A | 7/2002 | |
| KR | 10-0756310 A | 9/2007 | |
| KR | 10-0783667 B1 | 12/2007 | |
| KR | 10-2008-0098992 A | 11/2008 | |
| RU | 2285046 C2 | 6/2006 | |
| WO | 94/16807 A1 | 8/1994 | |
| WO | 2007/012027 A2 | 1/2007 | |
| WO | 2007/028776 A2 | 3/2007 | |
| WO | 2007/091834 A1 | 8/2007 | |
| WO | 2008/018760 A1 | 2/2008 | |
| WO | 2010-002815 A2 | 1/2010 | |
| WO | 2011/090689 A1 | 7/2011 | |

\* cited by examiner

FLUIDIZED BED REACTOR

CROSS-REFERENCE TO RELATED APPLICATION

This application claims priority under 35 U.S.C. §119 from Korean Application No. 10-2010-0095938 filed on Oct. 1, 2010, the subject matter of which is incorporated herein by reference.

BACKGROUND

1. Field

The present invention relates to a fluidized bed reactor.

2. Background

High purity polycrystal silicon that is useable in a semiconductor device or a solar cell has been consumed broadly. To fabricate such polycrystal silicon, silicon deposition has been used. According to the silicon deposition, silicon contained in reaction gas is deposited by pyrolysis of reaction gas and hydrogen reaction.

Mass production of the polycrystal silicon requires a fluidized bed reactor that is relatively large and high, compared with a conventional fluidized bed reactor used in a laboratory. Because of that, the fluidized bed reactor capable of produce the polycrystal silicon happens to have a large weight and a large volume and it is difficult to fabricate, install and maintain/repair such the fluidized bed reactor.

There have been active studies and researches on a fluidized bed reactor that is able to mass-produce the polycrystal silicon, with efficient fabrication, installation and maintenance.

SUMMARY

Accordingly, the embodiments may be directed to a fluidized bed reactor. To achieve these objects and other advantages and in accordance with the purpose of the embodiments, as embodied and broadly described herein, A fluidized bed reactor includes a head; a first body part connected with the head, located under the head, the first body part having a first reaction pipe provided therein; a second body part connected with the first body part, located under the first body part, the second body part having a second reaction pipe provided therein; and a bottom part connected with the second body part, located under the second body part, the bottom part having a flowing-gas supply nozzle, a reaction gas supply nozzle, a heater and an electrode assembled thereto.

In another aspect, a fluidized bed reactor includes a head; a body part connected with the head, located under the head; and a bottom part connected with the body part, located under the body part, wherein the bottom part may include a lower plate having a flowing-gas supply nozzle, a reaction gas supply nozzle assembled thereto; a first plate provided on the lower plate, to insulate the lower plate; a second plate provided on the first plate, to supply electricity to a heater; and a third plate provided on the second plate, to insulate the second plate.

In a further aspect, a fluidized bed reactor includes a head; a first body part connected with the head, located under the head, the first body part having a first reaction pipe, with a diameter smaller than a diameter of the head, provided therein; a second body part connected with the first body part, located under the first body part, the second body part having a second reaction pipe, with a diameter substantially identical to the diameter of the first reaction pipe, provided therein; and a bottom part connected with the second body part, wherein the first body part and the second body part may be able to be assembled to or disassemble from each other.

It is to be understood that both the foregoing general description and the following detailed description of the embodiments or arrangements are exemplary and explanatory and are intended to provide further explanation of the embodiments as claimed.

BRIEF DESCRIPTION OF THE DRAWINGS

Arrangements and embodiments may be described in detail with reference to the following drawings in which like reference numerals refer to like elements and wherein.

DETAILED DESCRIPTION

Reference may now be made in detail to specific embodiments, examples of which may be illustrated in the accompanying drawings. Wherever possible, same reference numbers may be used throughout the drawings to refer to the same or like parts.

Figure 1A:
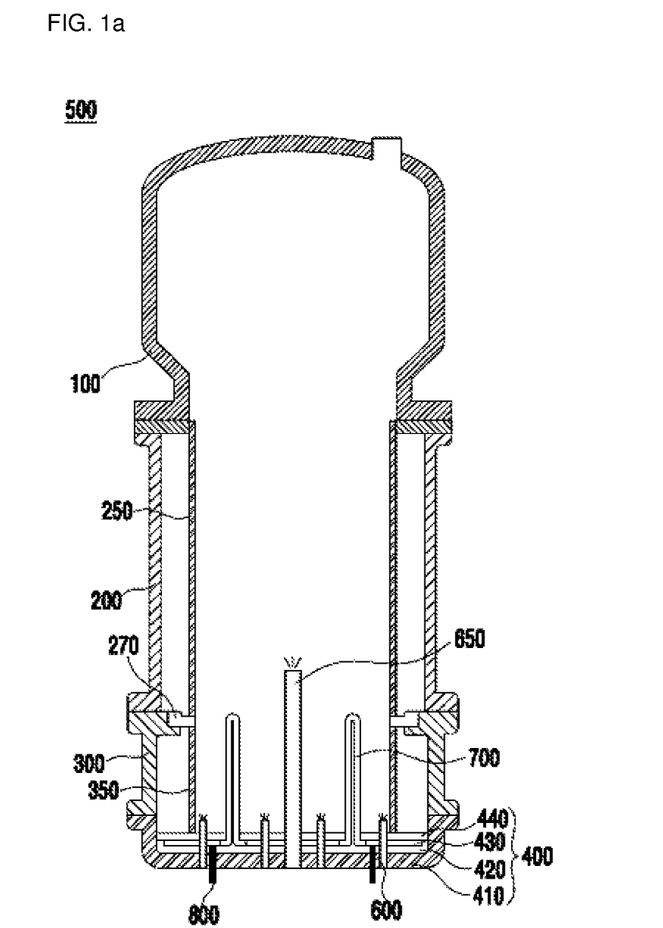
FIGS. 1a and 1b illustrate a fluidized bed reactor according to an exemplary embodiment.
Figure 1B:
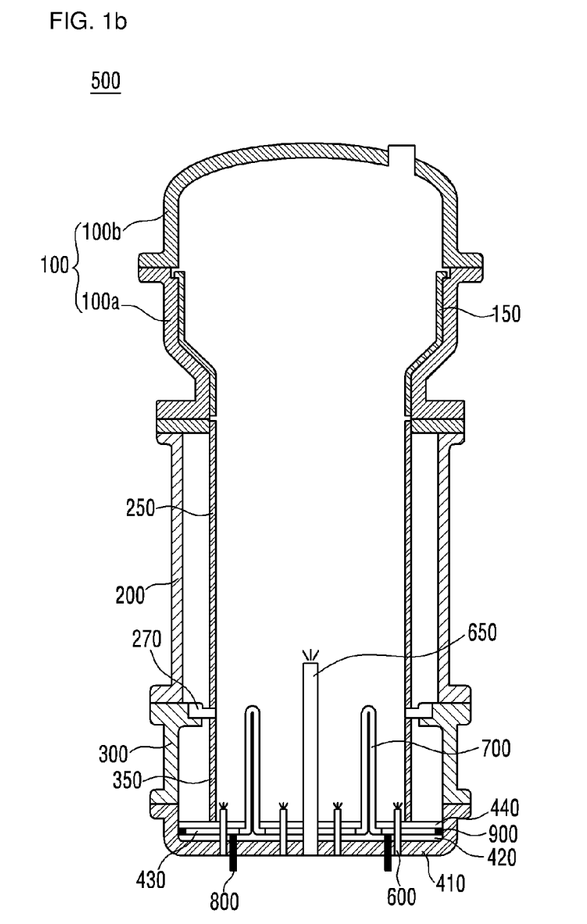

FIGS. 1a and 1b illustrate a fluidized bed reactor according to an exemplary embodiment. As shown in FIGS. 1a and 1b, a fluidized bed reactor 500 according to an exemplary embodiment may include a head 100, a first body part 200, a second body part 300 and a bottom part 400.

The head 100 may be connected with the first body part 200 and it may have a larger diameter than a diameter of a first reaction pipe 250 provided in the first body part 200. When gas and microelements pass the head 100 from the first reaction pipe 250, a velocity of gas and microelements may decrease because of the larger diameter possessed by the head 100.

As a result, load of a post-process for the exhausted gas or microelements may be reduced. An inner wall of the head 100 may be formed of an inorganic material that will not be transformed at a high temperature. For example, the inner wall of the head 100 may be formed of at least one of quartz, silica, silicon nitride, boron nitride, zirconia, silicon carbide, graphite, silicon and vitreous carbon.

Also, at least one of coating or lining that uses an organic polymer may be performed to the inner wall of the head 100, if it is possible to cool an outer wall of the head 100.

When the inner wall of the head 100 is formed of a material containing carbon such as silicon carbide, graphite and vitreous carbon, polycrystal silicon may be contaminated by carbon impurities. Because of that, silicon, silica, quartz or silicon nitride may be coated or lined on the inner wall of the head 100 which could contact with the polycrystal silicon.

Figure 2A:
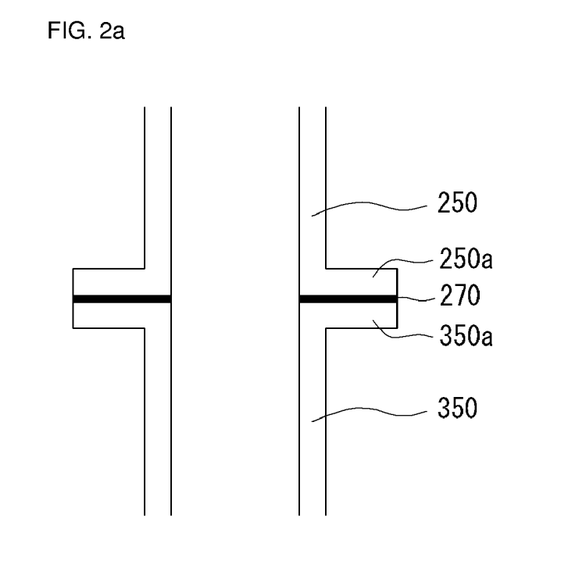
FIGS. 2a and 2b illustrate a connection structure between a first reaction pipe and a second reaction pipe according to the embodiment.
Figure 2B:
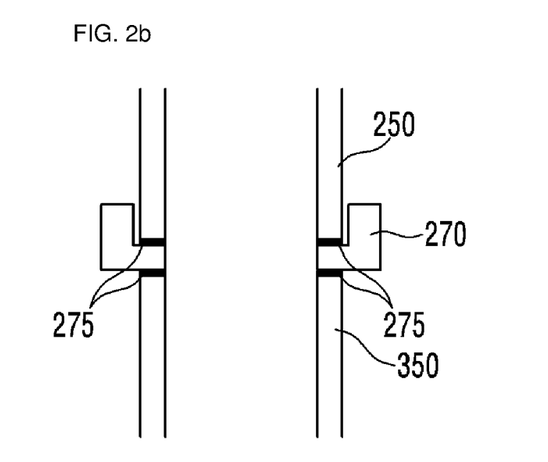

For example, the head 100 shown in FIG. 2b may include a plurality of heads 100a and 100b. A lining layer 150 may be located on an inner surface of the first head 100a.

The first body part 200 may be located under the head 100, with connected with the head 100, and it may provide a predetermined space where polycrystal silicon deposition reaction may occur.

The second body part 300 may be located under the first body part 200, with connected with the first body part 200. Together with the first body part 200, the second body part 300 may provide a predetermined space where at least one of polycrystal silicon deposition reaction or heating reaction may occur.

The bottom part 400 may be located under the second body part 300, with connected with the second body part 300. A variety of nozzles 600 and 650, a heater 700 and an electrode 800 may be coupled to the bottom part 400 for the polycrystal silicon deposition.

At this time, the head 100, the first body part 200 and the second body part 300 may be formed of a proper metal material that is easy to treat with good mechanical strength and rigidity such as carbon steel, stainless steel and various steel alloys. A protection layer for the first and second body parts 200 and 300 formed of the material mentioned above may be formed of metal, organic polymer, ceramic or quartz.

When fabricating the head 100, the first body part 200 and the second body part 300, a gasket or a sealing material may be used to shut off the inside of the reactor from external space. Each of the first and second body parts 200 and 300 may have a variety of shapes including a cylindrical pipe, a flange, a tube, a fitting, a plate, a corn, an oval or a jacket having a cooling medium flowing between double-framed walls, Also, when the head 100, the first body part 200 and the second body part 300 are formed of the metal material, a protection layer may be coated on an inner surface possessed by each of them or a protection pipe or a protection wall may be installed additionally. The protection layer, pipe or wall may be formed of a metal material. However, a non-metal material such as organic polymer, ceramic and quartz may be coated or lined on the protection layer, pipe or wall to prevent contamination inside the reactor.

The first and second body parts 200 and 300 may be maintained blow a predetermined range of temperatures by cooling fluid such as water, oil, gas and air, to prevent heat expansion, to protect workers and to prevent accidents. Inner or outer walls of components provided in the first and second body parts 200 and 300 that need cooling may be fabricated to allow the cooling fluid to circulate there through.

In the meanwhile, an insulator may be arranged on an outer surface of each of the first and second body parts 200 and 300 to protect workers and to prevent too much heat loss.

As mentioned above, it might be difficult to fabricate, install and maintain/repair the fluidized bed reactor in case of increasing the size and height of the fluidized bed reactor for the mass production of the polycrystal silicon. In other words, if fabricating, installing and maintaining/repairing a fluidized bed reactor including a reaction pipe and a single body part, that is large-sized, high and heavy, it might be difficult to treat the body part and the body part might damage after colliding with a nozzle or a reaction pipe.

In contrast, the fluidized bed reactor according to the embodiment may include the plurality of the body parts 200 and 300 and the reaction pipes 250 and 350. Because of that, it may be smooth and each to fabricate, install and maintain/repair the fluidized bed reactor.

As follows, a process of assembling the fluidized bed reactor according to the embodiment will be described.

A first reaction pipe 250 may be assembled to be located inside the first body part 200 and a second reaction pipe 350 may be assembled to be located inside the second body part 300. Various nozzles 600 and 650, an electrode 800 and a heater 700 are assembled to the bottom part 400 configured to close a bottom of the second body part 300 airtight. The bottom part 400 may be connected with a lower area of the second body part 300 having the second reaction pipe 350 provided therein. After that, the first body part 200 and the second body part 300 may be connected with each other and the head 100 may be connected with the first body part 200.

The electrode 800 arranged in the bottom part 400 will be described later in reference to FIGS. 4a and 4c. The various nozzles assembled to the bottom part 400 may include a flowing-gas supply nozzle 600 and a reaction gas supply nozzle 650.

FIGS. 2a and 2b illustrate a connection structure between the first reaction pipe and the second reaction pipe.

As shown in FIG. 2a, the first reaction pipe 250 and the second reaction pipe 350 may include projections 250a and 350a, respectively, and the projections 250a and 350a may be projected toward the first and second body parts 200 and 300 from ends of the first and second reaction pipes 250 and 350, respectively. Here, the projection 250a of the first reaction pipe 250 may face the projection 350a of the second reaction pipe 350 in opposite. Because of that, a contact area between the first and second reaction pipes 250 and 350 may be enlarged enough to reduce the possibility of damage when the first and second reaction pipes 250 and 350 are connected with each other.

As shown in FIG. 2b, a supporting ring 270 may be disposed between the first and second reaction pipes 250 and 350, considering durability weakness of the first and second reaction pipes 250 and 350.

The supporting ring 270 may be formed of an inorganic material that is not transformed at a high temperature. For example, the inorganic material may be quartz, silica, silicon nitride, boron nitride, zirconia, silicon carbide, graphite, silicon, vitreous carbon or a compound of those materials. When the supporting ring 270 is formed of the material containing carbon such as silicon carbide, graphite and vitreous carbon, the carbon containing material might contaminate the polycrystal silicon. Because of that, silicon, silica, quartz, silicon nitride and the like may be coated or lined a surface of the supporting ring 270 that contacts the polycrystal silicon. A sealing material 275 may be finished on the supporting ring 270.

The sealing material 275 formed in a sheet, knit or felt shape may be located between the first reaction pipe 250 and the second reaction pipe 350 as shown in FIG. 2a or between the supporting ring 270 and the first reaction pipe 250 as shown in FIG. 2b and between the supporting ring 270 and the second reaction pipe 350.

The sealing material 275 may be formed of a fibrous material containing silicon, to have high temperature strength and an anti-contamination property. According to the embodiment, the first reaction pipe 250 and the second reaction pipe 350 may be provided for convenience of assembly, installation and maintenance. Here, there may be a predetermined gap between the first reaction pipe 250 and the second reaction pipe 350. The sealing material 275 according to the embodiment may close the gap between the first reaction pipe 250 and the second reaction pipe 350 and it may prevent silicon particles from leaking outside. In addition, when connecting the first reaction pipe 250 and the second reaction pipe 350 with each other, the sealing material 275 may reduce a danger of damage. The first and second reaction pipes 250 and 350 may be tube-shaped or partially tube-shaped, corn-shaped and overall-shaped. Each End of the first and second reaction pipes 250 and 350 may be processed to be a flange type. The first and second reaction pipes 250 and 350 may be configured of a plurality of parts and some of the parts may be arranged on inner walls of the first and second body parts 200 and 300 as liners.

The first and second reaction pipes 250 and 350 may be formed of an inorganic material that is not transformed easily at a high temperature. The inorganic material may be quartz, silica, silicon nitride, boron nitride, zirconia, yttria, silicon carbide, graphite, silicon, vitreous carbon and a compound of them.

When the first and second reaction pipes 250 and 350 are formed of such the carbon containing material such as silicon carbide, graphite, vitreous carbon and the like, the carbon containing material might contaminate the polycrystal silicon. Because of that, silicon, silica, quartz, silicon nitride and the like may be coated or lined on each inner wall of the first and second reaction pipes that contact with the polycrystal silicon.

The flowing gas supply nozzle 600 may be configured to supply flowing-gas that enables silicon particles to flow. At this time, the flowing-gas may include at least one of hydrogen, nitrogen, argon, helium, hydrogen chloride (HCl), silicon tetra chloride (SiCl$_4$). The flowing-gas supply nozzle 600 may be a tub, a liner or a molded material.

The reaction gas supply nozzle 650 may be configured to supply reaction gas that containing silicon elements to a silicon particle layer. The reaction gas is raw material gas that is used in deposition of polycrystal silicon and it may include silicon elements. The reaction gas may include at least one of monosilan (SiH$_4$), disilane (Si$_6$H$_6$), higher-silane (Si$_n$H$_{2n+2}$, 'n' is a 3 or more a natural number), dichlide silane (SCS: SiH$_2$Cl$_2$), trichlide silane (TCS: SiHCl$_3$), tetra chlide silane (STC: SiCl$_4$), dibromosilane (SiH$_2$Br$_2$), tribromo silane (SiHBr$_3$), silicontetrabromide (SiBr$_4$), diiodosilane (SiH$_2$I$_2$), triiodosilane (SiHI$_3$) and silicontetraiodide (SiI$_4$).

At this time, the reaction gas may further include at least one of hydrogen, nitrogen, argon, helium or hydrogen chloride. Polycrystal silicon is deposited on a surface of a seed crystal and the size of the polycrystal silicon may be increased. When the size of the polycrystal silicon is increased up to a preset value, the reaction gas may be exhausted outside the fluidized bed reactor.

The heater 700 may supply heat that is used for generating silicon deposition reaction on the surface of the polycrysal silicon within the fluidized bed reactor 500. The heater 700 may include at least one of graphite, ceramic such as and a metal material.

The nozzles 600 and 650, the electrode 700 and the heater 700 may be assembled to the bottom part 400, together with plates 410 to 440 composing the bottom part 400. As shown in FIGS. 1a and 1b, the bottom part 400 according to the embodiment may include a lower plate 410 and first to third plates 420, 430 and 440.

The lower plate 410 may be connected with the second body part 300, having the flowing-gas supply nozzle and the reaction gas supply nozzle assembled thereto. The lower plate 410 may be formed of a metal material that is easy and efficient to process, with an excellent mechanical strength and rigidity, such as carbon steel, stainless steel and alloy steel.

The first plate 420 may be located on the lower plate 410, to insulate the lower plate 410. Because of that, the first plate 420 may be formed of a proper material that may not contaminate the deposited polycrystal silicon, even with an insulation property, such as quartz. The first plate 420 may be formed of a ceramic material such as silicon nitride, alumina and yttria, rather than quartz. If necessary, such a ceramic material may be coated or lined on a surface of the first plate 420.

The second plate 430 may be located on the first plate 420 and it may contact with the heater 700 to supply electricity to the heater 700. Because of that, the second plate 430 may be formed of a conductive material such as graphite, graphite having silicon carbide coated thereon, silicon carbide and graphite having silicon nitride coated thereon.

The first plate 420 having the insulation property may be located between the lower plate 410 and the second plate 430, such that the lower plate 410 may be insulated from the second plate 430.

The second plate 430 may be in contact with the heater 700 and heat may be generated from the second plate 430. However, the second plate 430 may have a relatively large sectional area where electric currents flow, compared with a sectional area of the heater where electric currents flow. Because of that, the heat generated in the second plate 430 may be much smaller than the heat generated in the heater 700. Also, to reduce the heat generated in the second plate 430, a graphite sheet may be insertedly disposed between the second plate 430 and the heater 700.

When the lower plate 410 and the second plate 430 have conductivity, a leakage current might be generated by the contact between the lower plate 410 and the second plate 430 and the leakage current might flow to the lower plate 410. Because of that, an end of the lower plate 410 may be spaced apart a proper distance from an end of the second plate 430 as shown in FIGS. 1a and 1b.

In other words, a recess may be formed in the first plate 420 and the second plate 430 may be seated in the recess. For example, a recess having the same or larger length as the length of the second plate 430 may be formed in the first plate 420 and the second plate may be seated in the recess of the first plate 420. As a result, a proper area of the first plate 420 may be positioned between the lower plate 410 and the end of the second plate 430, to maintain the insulation between the lower plate 410 and the second plate 430.

As shown in FIG. 1a, the lower plate 410 and the second plate 430 may be insulated from each other by the first plate 420. Alternatively, as shown in FIG. 1b, an insulation ring 900 may be arranged around a rim of the second plate 430, to insulate the lower plate 410 from the second plate 430. At this time, the insulation ring 900 may be formed of quartz and ceramic.

The third plate 440 may be located on the second plate 430 to prevent the polycrystal silicon deposited from the first and second reaction pipes 250 and 350 from being contaminated from the second plate 430, with an insulation property. Because of that, the third plate 440 may be formed of an inorganic material that may not be transformed at a high temperature, namely, high-temperature-resist. The inorganic material may be quartz, silica, silicon nitride, boron nitride, zirconia, silicon carbide, graphite, silicon, vitreous carbide or a compound of them. When the third plate 440 is formed of the carbon containing material such as silicon carbide, graphite and vitreous carbon, the carbon containing material might contaminate the polycrystal silicon. Silicon, silica, quartz, silicon nitride and the like may be coated or lined on a surface of the third plate 440.

Figure 1C:
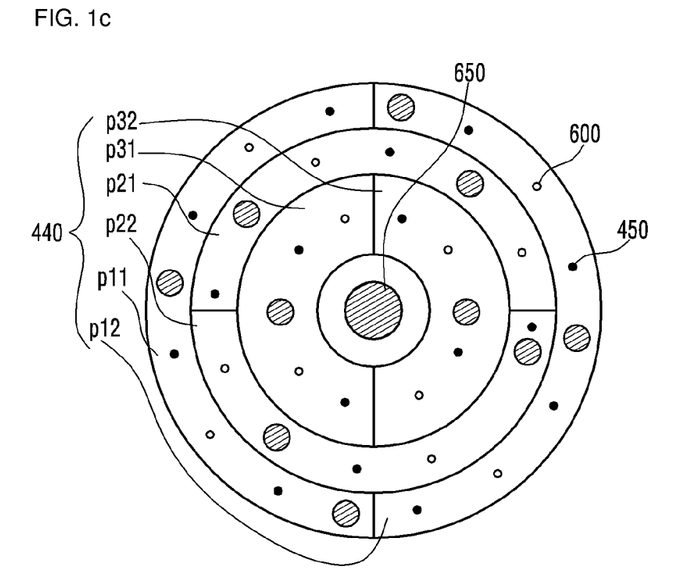
FIGS. 1c and 1d illustrate a plate provided in the fluidized bed reactor according to the embodiment.
Figure 1D:
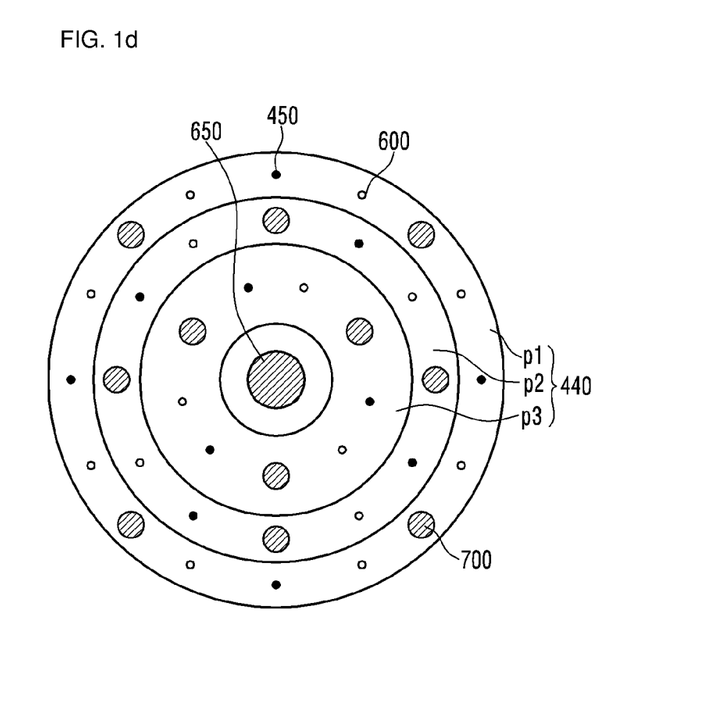

Also, each of the second plate and the third plates 440 composing the bottom part 400 may include a plurality of unit-plates, not as a single body. Because of that, the assembly, installation and maintenance of the fluidized bed reactor may be more smooth and efficient. In other words, the size of the fluidized bed reactor is increased for the mass production of polycrystal silicon. When each of the second and third plates 430 and 440 is formed as a single body, the assembly, installation and maintenance of the fluidized bed reactor may be difficult. For example, as shown in FIG. 1*c*, the third plate 440 may be configured of unit-plates p11, p12, p21, p22, p31 and p32 cut away along a concentric direction and a diameter direction with respect to the third plate 440. As shown in FIG. 1*d*, the third plate 440 may be configured of unit-plates p1, p2 and p3.

Figure 3:
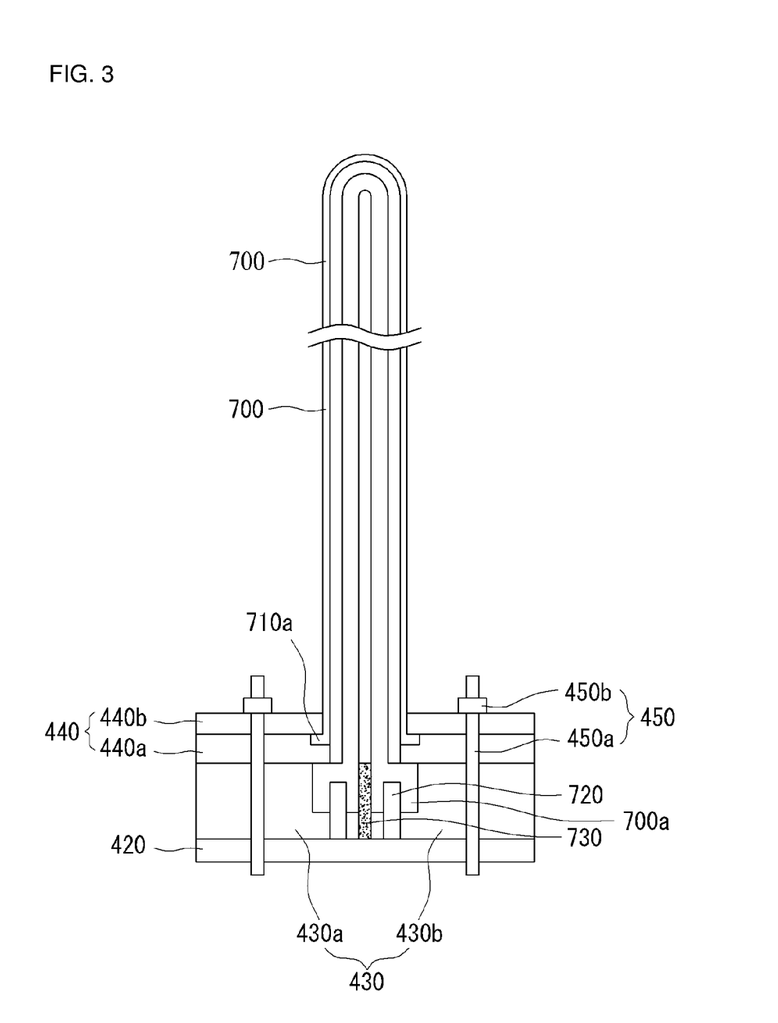
FIG. 3 illustrates an assembling structure between plates and a heater, which are provided in the fluidized bed reactor according to the embodiment.

FIG. 3 illustrates an assembling structure between the plates and heater provided in the fluidized bed reactor. As shown in FIG. 3, the lower plate 410, the third plate 420, the second plate 430 and the third plate 440 may be fixed, specifically, fastened by a fastening bolt 450 passing through the lower plate 410, the third plate 420, the second plate 430 and the third plate 440.

As shown in FIG. 3, the plurality of the plates 410 to 440 composing the lower part 400 may be fastened to each other by the fastening bolt 450, passing through the plates 410 to 440. Such fastening bolt 450 may be formed of an inorganic material that may not be easily transformed at a high temperature. The inorganic material may be quartz, silica, silicon nitride, boron nitride, zirconia, silicon or a compound of them. When the fastening bolt 450 is formed of a carbon containing material such as silicon carbide, graphite, vitreous carbon, silicon, silica, quartz and silicon nitride may be coated or line on a surface of the fastening bolt 450 to prevent the carbon containing material from contaminating the polycrystal silicon or a cap formed of silicon, silica, quartz and silicon nitride may be provided on the fastening bolt 450. The fastening bolt 450 may be coupled to the plurality of the plates 410 to 440 by a screw.

In the meanwhile, a fixing part 720 may be arranged in the bottom part 400 to which the heater 700 will be assembled. The fixing part 720 such as a pin or clip may be coupled to a perforation formed in the second plate 430 out of the plates that are connected with the heater 700. A plurality of grooves may be formed in the heater 700 to insert the fixing part 720 therein. A manufacture or user may pressingly insert the heater 700 to the fixing part 720, to fix the heater 700 to the bottom part 400. As a result, a fastening process that uses a screw and a bolt may not need in the assembling process of the heater 700 and the heater 700 may be assembled more simply. The heater 700 according to this embodiment has "U"-shaped and two of the fixing part 720 may be required for a single heater 700. However, the number of the fixing parts 720 may be variable according to the shape of the heater 700. The fixing part 720 may be formed of a proper material having a good electrical conductivity and a good docility such as graphite or metal.

The second plate 430 may include a plurality of unit-plates and a lower portion of the heater 700 may be in contact with neighboring unit-plates 430*a* and 430*b*. Because of that, electricity may be supplied to the heater 700 via the unit-plates 430*a* and 430*b* of the second plate 430. At this time, the heater 700 may include a projection 700*a* extended from the lower portion of the heater, where the heater 700 is connected with the lower part 400, along a perpendicular direction with respect to a longitudinal direction of the heater 700.

The projection 700*a* of the heater may be coupled to the fixing part 720 and covered by the third plate 440 at the same time, to fix the heater 700 more stably.

The neighboring unit-plates 430*a* and 430*b* may be insulated from each other. For example, an insulative material may be disposed between the unit-plates 430*a* and 430*b* provided in the second plate 430 in contact with the lower portion of the heater 700. The insulative material 730 may insulate between the unit-plates 430*a* and 430*b* in contact with the lower portion of the heater 700, to prevent generation of leakage currents. The unit plates 430*a* and 430*b* will be described in detail later.

The heater 700 according to the embodiment may include a large surface area per unit volume. A corrugated portion may be formed in a surface of the heater 700 to enhance heating efficiency. Rather than the corrugation, various types of protrusions or patterns may be formed in the surface of the heater 700 to enlarge the surface area to enhance the heating efficiency. As a result, at least one of the corrugation, protrusion and pattern may be formed in the surface of the heater 700.

After the fixing part 720 is inserted in the heater 700, a heater cap 710 may cover a profile of the heater 700 to prevent exposure of the heater 700 to prevent the contamination of the polycrystal silicon.

To perform such a function of the heater cap 710, the heater cap 710 may be formed of an inorganic material that is not easily transformed at a high temperature. The inorganic material may be quartz, silica, silicon nitride, boron nitride, zirconia, yttria, silicon and a compound of them. When the heater cap 710 is formed of a carbon containing material, silicon, silica, quartz and silicon nitride may be coated or lined on the surface of the heater cap 710 to prevent the contamination of the polycrystal silicon that might be generated by the carbon containing material.

The heater cap 710 may include a hooking protrusion 710*a* extended along a longitudinal direction with respect to the longitudinal direction of the heater cap. The hooking protrusion 710*a* of the heater cap 710 may be disposed between unit-plates 440*a* and 440*b* of the third plate 440.

As follows, the electrical connection with the heater in detail in reference to the corresponding accompanying drawings.

Figure 4A:
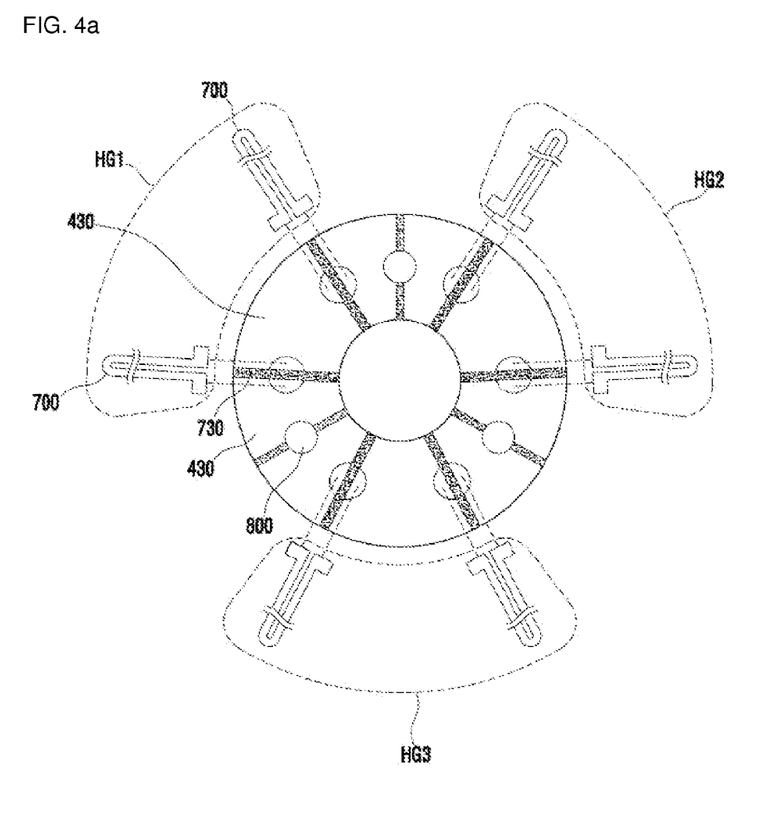
FIGS. 4a to 4c illustrate an electrical connection between a heater and a second plate according to the embodiment.
Figure 4B:
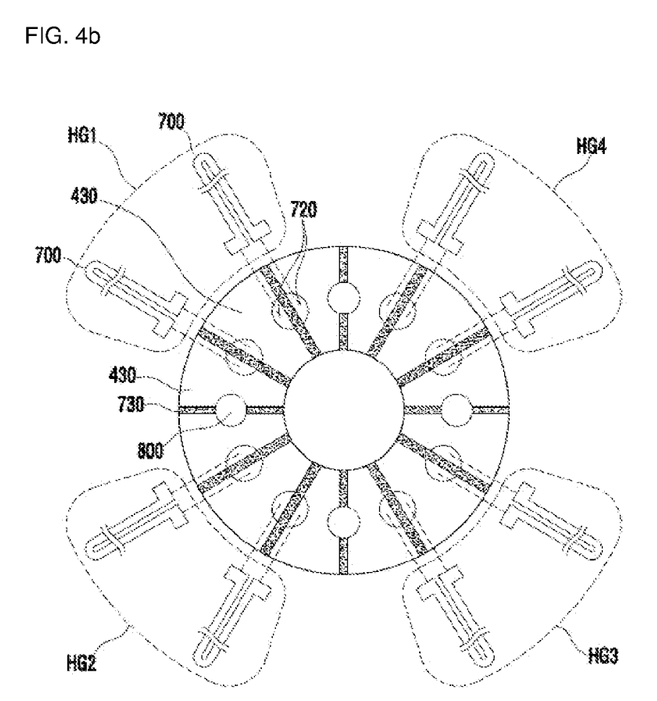
Figure 4C:
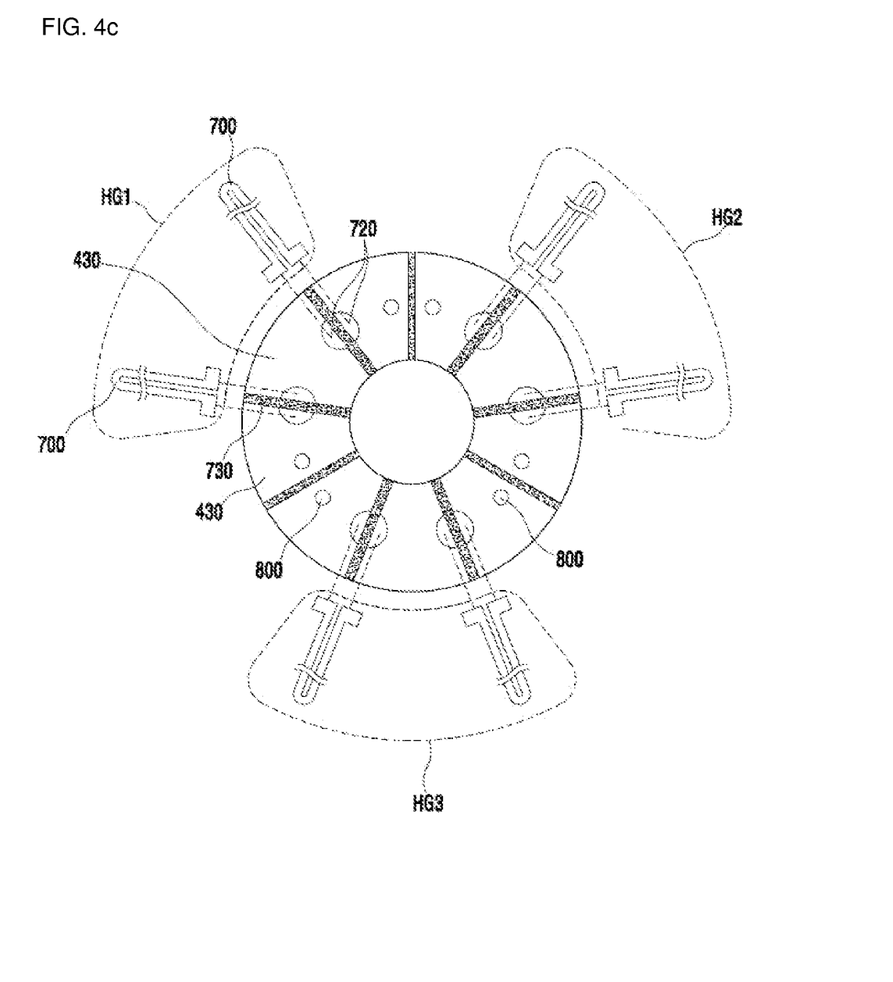

FIGS. 4*a* to 4*c* illustrate the electrical connection between the heater and the second plate according to the embodiment.

In reference to FIGS. 4*a* to 4*c*, each of heater groups HG1, HG2 and HG3 may be connected with two electrodes 800 and the electricity consumed by the heater groups HG1 to HG3 may be identical. The electrode 800 may be formed of graphite, silicon carbide, metal or a compound of them. The electrode 800 may have a shape of a cable, a pole, a rod, a molded-part, a socket, a coupler, a bar, a braided wire or combination of them. At this time, two of the heater groups may be connected with a single electrode 800 as shown in FIGS. 4*a* and 4*b*. In case of n-tuple heaters ("n" is a natural number of 2 or more), the fluidized bed reactor may include n-tuple electrodes 800.

Electric resistances of the heater groups (HG1 to HG 3) may be the same. In other words, the number of the heaters 700 possessed by each of the heater groups (HG1, HG2 and HG3) is fixed and resistances of the heaters 700 possessed by each of the heater groups (HG1, HG2 and HG3) may be identical. When the number of the heaters 700 possessed by each of the heater groups (HG1, HG2 and HG3) is identical to the number of the heater possessed by the other, the assembly, installation and maintenance/repair of the fluidized bed reactor may be more smooth and efficient. Two heaters 700 are provided in each of the heater groups (HG1, HG2 and HG3) uniformly and resistances of the heaters 700 provided in the heaters 700 may be identical to each other.

Even when resistances of heaters 700 composing heater groups HG1 to HG4 are different from each other, the heaters 700 may be arranged properly to make resistances of the heater groups HG1 to HG4 identical to each other and then the electricity consumed by the heater groups HG1 to HG4 may be identical to each other. Because of that, the heat may be supplied to the fluidized bed reactor 500 uniformly.

As mentioned above, as the fluidized bed reactor is getting enlarged for the mass production of polycrystal silicon, an internal area of the fluidized bed reactor may be getting enlarged. As a result, the heater groups HG1 to HG3 have to supply heat to the internal area of the fluidized bed reactor uniformly. The heater groups HG1, HG2 and HG3 provided in the fluidized bed reactor according to this embodiment may heat the entire internal area of the fluidized bed reactor uniformly, and the fluidized bed reactor may mass-produce polycrystal silicon products having a good quality.

Electric voltage having different phases may be supplied to the heater groups HG1 to HG3, respectively. For example, in case the fluidized bed reactor includes three heater groups HG1 to HG3, electric voltages having three different phases may be supplied to the heater groups HG1, HG2 and HG3, respectively. At this time, a phase difference among the phases may be 120° C.

The electric voltages supplied to the heater groups HG1 to HG3 may be controlled independently, to allow each of the heater groups HG1 to HG3 to consume the same electricity. For example, when electric resistances of each heater groups HG1, HG2 and HG3 are different from electric resistances of the other or it is difficult to supply the same electricity, a single-phased electric voltage having a different size may be supplied to each of the heater groups HG1 to HG3 to allow each of the heater groups HG1, HG2 and HG3 to consume the same electricity.

In case of supplying a multi-phased power voltage, neighboring two of the heater groups may share the electrodes 800 with the others as shown in FIGS. 4a and 4b. In case of supplying a single-phased electric voltage as shown in FIG. 4c, one of the heater groups may be connected with two of the electrodes 800 that are not shared with the other heater groups.

As mentioned above, the heater 700 may be in contact with the unit-plates 430a and 430b insulated from each other. For example, the material used to form the heater 700 and the unit-plates 430a and 430b is described above and description of the material will be omitted accordingly.

Unit-plates shown in FIG. 4a may be corresponding to unit-plates 430a and 430b shown in FIG. 3.

In the meanwhile, the fluidized bed reactor shown in FIG. 4a may include three heater groups HG1, HG2 and HG3 and the fluidized bed reactor shown in FIG. 4b in FIGS. 4a and 4b may include four heater groups HG1, HG2, HG3 and HG4. However, the embodiment may not be limited thereby.

Figure 5:
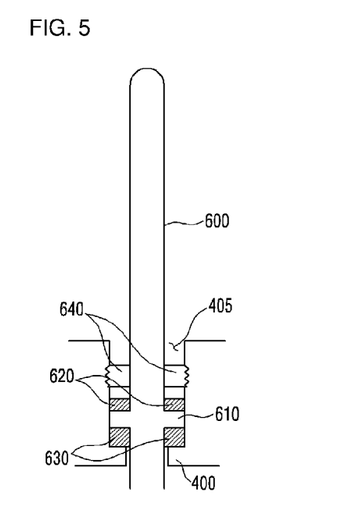
FIG. 5 illustrates an assembling structure of a gas supply nozzle provided in the fluidized bed reactor according to the embodiment.

FIG. 5 illustrates an assembling structure of the flowing-gas supply nozzle provided in the fluidized bed reactor according to the embodiment. As shown in FIG. 5, a flange 610 may be formed in the flowing-gas supply nozzle 600 to fix the flowing-gas nozzle 600 and a hole 405 may be formed in the bottom part 400 of the fluidized bed reactor to seat the flowing-gas supply nozzle 600 therein.

A first buffer 620 and a second buffer 630 may be arranged in an upper area and a lower area of the flange 610, respectively. The first buffer 620 and the second buffer 630 may surround the flange 610 of the flowing-gas supply nozzle 600, to protect the flowing-gas nozzle 600 from an external shock. In addition, the first buffer 620 and the second buffer 630 may enable the flowing-gas supply nozzle 600 assembled stably enough to provide stable sealing.

A screw thread may be formed in an entire area or a proper area of a surface of the hole 405. A bushing 640 having a screw thread formed in an outer surface thereof may be screw-fastened to the screw thread formed in the surface of the hole 405 after the flowing-gas supply nozzle 600 is seated in the hole 405 together with the buffers 620 and 630. The screw-fastened bushing 640 may prevent separation or movement of the flow-gas supply nozzle 600 which might be generated by a high-pressured-flowing-gas during the operation of the fluidized bed reactor.

Figure 6:
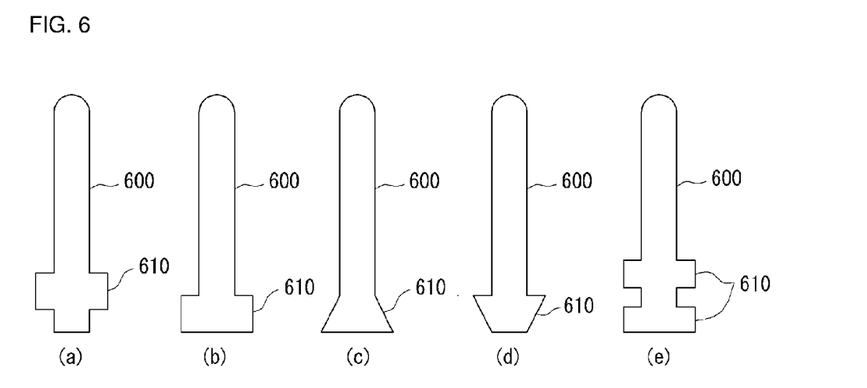
FIG. 6 illustrates various examples of the gas supply nozzle provided in the fluidized bed reactor according to the embodiment.

FIG. 6 illustrates various modified examples of the flowing-gas supply nozzle provided in the fluidized reactor according to the embodiment.

(a) and (b) of FIG. 6 illustrate a flowing-gas supply nozzle 600 including a flange 610 with a preset thickness. (c) of FIG. 6 illustrates a flowing-gas nozzle 600 including a flange with a decreasing thickness toward a lower portion of the flowing-gas supply nozzle in contact with the bottom part 400. (d) of FIG. 6 illustrates a flowing-gas supply nozzle including a flange with a gradually increasing thickness toward a lower portion of the flowing-gas supply nozzle. (e) of FIG. 6 illustrates a flowing-gas supply nozzle including a plurality of flanges with a preset fixed thickness.

The space defined by the second reaction pipe 350 and the bottom part 400 may include a space occupied by the heater 700 and the other space. The other space may be filled with beads. A predetermined space between beads may be employed as a channel where the flowing-gas passes and the beads may disperse the flowing-gas inside the fluidized bed reactor uniformly. The bead may spherical-shaped, overall-shaped, fillet-shaped, nugget-shaped, tube-shaped, rod-shaped, ring-shaped or combinational-shaped. The bead may be formed of high purity silicon or the same material used to form the reaction pipes 250 and 350. The size of the bead may be larger than a diameter of a product outlet through which the polycrystal silicon is exhausted outside the fluidized bed reactor. An average diameter of the bead may be more than 5 mm less than 50 mm. As a result, the beads may not be exhausted outside via the product outlet.

The fluidized bed reactor according to the embodiment may include the first body part 200 and the second body part 300. Because of that, the assembly, installation and maintenance/repair of the fluidized bed reactor may be smooth and efficient. When the beads are filled in a status of the first and second body parts 200 and 300 being assembled to each other, an overall height of the first and second body parts 200 and 300 may be substantially high to make it difficult to fill the beads. Also, falling beads happen to damage or break the heater 700, the nozzle or the first and second reaction pipes 250 and 350 located in the fluidized bed reactor. However, according to the embodiment, the beads may be filled into the space defined by the second reaction pipe 350 and the bottom part 400 before the first and second body parts 200 and 300 are assembled to each other. As a result, the filling process of the beads may be performed stably.

After filling the beads, the second body part 300 may be assembled to the first body part 200. As the second body part 300 is assembled to the first body part 200, the first reaction pipe 250 inserted in the first body part 200 may be connected with the second reaction pipe 350 inserted in the second body part 300.

The space formed between the first body part 200 and the first reaction pipe 250 and the space formed between the second body part 300 and the second reaction pipe 350 may be filled with an inert gas that may not react with the polycrystal silicon such as hydrogen, nitrogen, argon and helium.

To shut off leakage of the heat, which will be transported to the inside of the fluidized bed reactor, an inorganic insulator may be arranged in the space between the first body part 200 and the first reaction pipe 250, the space between the second body part 300 and the second reaction pipe 350 or the other required spaces. The shape of the insulator may be a cylinder, a block, a fabric, a blanket, a felt, a blowing agent and a filling layer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments. Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fluidized bed reactor comprising:
    a head;
    a first body part connected with the head, located under the head, the first body part having a first reaction pipe provided therein;
    a second body part connected with the first body part, located under the first body part, the second body part having a second reaction pipe provided therein; and
    a bottom part connected with the second body part, located under the second body part, the bottom part having a flowing-gas supply nozzle, a reaction gas supply nozzle, a heater and an electrode assembled thereto,
    wherein the heater is covered by a heater cap.

2. The fluidized bed reactor of claim 1, wherein the flowing-gas supply nozzle comprises a flange extended perpendicularly with respect to a longitudinal direction of the flowing-gas supply nozzle, and
    the bottom part comprises a hole to seat the flowing-gas supply nozzle seated therein, and
    first and second buffers are arranged in upper and lower areas of the flange, respectively, to surround the flowing-gas supply nozzle.

3. The fluidized bed reactor of claim 1, wherein the first and second reaction pipes comprise projections projected toward the first body part and the second body part, respectively, the projection of the first reaction pipe faces the projection of the second reaction pipe in opposite.

4. The fluidized bed reactor of claim 3, wherein a sealing material is provided between the projection of the first reaction pipe and the projection of the second reaction pipe.

5. The fluidized bed reactor of claim 1, wherein a supporting ring is disposed between the first reaction pipe and the second reaction pipe.

6. The fluidized bed reactor of claim 5, wherein sealing materials are provided between the supporting ring and the first reaction pipe and between the supporting ring and the second reaction pipe, respectively.

7. The fluidized bed reactor of claim 1, wherein the heater comprises a plurality of heater groups, and
    the plurality of the heater groups consume the same electricity.

8. The fluidized bed reactor of claim 7, wherein neighboring two of the heater groups are connected with a single electrode jointly.

9. The fluidized bed reactor of claim 7, wherein each of the heater groups is connected with two electrodes independently.

10. A fluidized bed reactor comprising:
    a head;
    a body part connected with the head, located under the head;
    a bottom part connected with the body part, located under the body part; and
    a heater coupled to the bottom part to supply heat that is used for generating silicon deposition reaction,
    wherein the bottom part comprises a lower plate having a flowing-gas supply nozzle, a reaction gas supply nozzle assembled thereto; a first plate provided on the lower plate, to insulate the lower plate; a second plate provided on the first plate, to supply electricity to the heater; and a third plate provided on the second plate, to insulate the second plate,
    wherein the second plate has a relatively large sectional area where electric current flows compared with a sectional area of the heater where current flows.

11. The fluidized bed reactor of claim 10, wherein an end of the second plate is spaced apart a proper distance from a surface of the lower plate.

12. The fluidized bed reactor of claim 10, wherein a predetermined area of the first plate is located between the lower plate and an end of the second plate.

13. The fluidized bed reactor of claim 10, wherein an insulation ring is arranged to surround a rim of the second plate.

14. The fluidized bed reactor of claim 10, wherein each of the first and second plates comprises a plurality of unit-plates.

15. The fluidized bed reactor of claim 10, wherein the second plate comprises a plurality of unit-plates, and
    a lower portion of the heater is in contact with neighboring ones of the unit-plates, and
    the neighboring unit-plates are insulated from each other.

16. The fluidized bed reactor of claim 10, wherein the heater comprises a projection extended perpendicularly with respect to a longitudinal direction of the heater, and the projection is covered by the first plate.

17. The fluidized bed reactor of claim 10, wherein the heater is covered by a heater cap, and
    the heater cap comprises a hooking protrusion extended perpendicularly with respect to a longitudinal direction of the heater cap, and
    the hooking protrusion of the heater cap is fixedly disposed between unit-plates of the first plates.

18. A fluidized bed reactor comprising:
    a head;
    a first body part connected with the head, located under the head, the first body part having a first reaction pipe, with a diameter smaller than a diameter of the head, provided therein;
    a second body part connected with the first body part, located under the first body part, the second body part having a second reaction pipe, with a diameter substantially identical to the diameter of the first reaction pipe, provided therein;

a bottom part connected with the second body part, in which includes a lower plate, a first plate, a second plate and a third plate, which are layered sequentially; and a heater coupled to the bottom part to supply heat that is used for generating silicon deposition reaction, wherein the first body part and the second body part are able to be assembled to or disassemble from each other and the second plate includes a plurality of unit-plates so that the heater is contact with neighboring ones of the plurality of unit-plates of the second plate and is assembled thereto.

* * * * *